US011061389B2

(12) United States Patent
Wilber et al.

(10) Patent No.: US 11,061,389 B2
(45) Date of Patent: Jul. 13, 2021

(54) SYSTEMS AND METHODS FOR MAINTAINING EQUIPMENT IN AN INDUSTRIAL AUTOMATION ENVIRONMENT

(71) Applicant: ROCKWELL AUTOMATION TECHNOLOGIES, INC., Mayfield Heights, OH (US)

(72) Inventors: Andrew Wilber, Franklin, WI (US); Jeromy Scott Humphrey, Littleton, CO (US); Michael James Lanphear, Greenfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/738,947

(22) Filed: Jan. 9, 2020

(65) Prior Publication Data
US 2020/0166917 A1 May 28, 2020

Related U.S. Application Data

(63) Continuation of application No. 15/043,936, filed on Feb. 15, 2016, now abandoned.

(60) Provisional application No. 62/139,182, filed on Mar. 27, 2015, provisional application No. 62/256,490, filed on Nov. 17, 2015.

(51) Int. Cl.
G05B 19/418 (2006.01)

(52) U.S. Cl.
CPC ............ *G05B 19/41875* (2013.01); *G05B 2219/31316* (2013.01); *Y02P 90/02* (2015.11)

(58) Field of Classification Search
CPC .... G05B 19/41875; G05B 2219/31316; Y02P 90/22
See application file for complete search history.

(56) References Cited

U.S. PATENT DOCUMENTS

| 2002/0059320 | A1* | 5/2002 | Tamaru | E02F 9/26 |
| 2002/0116148 | A1* | 8/2002 | Bertsch | G05B 19/4065 |
| | | | | 702/184 |
| 2015/0316911 | A1 | 11/2015 | Rischar et al. | |

\* cited by examiner

*Primary Examiner* — Eva Y Montalvo
*Assistant Examiner* — Antonio B Crite
(74) *Attorney, Agent, or Firm* — Fletcher Yoder P.C.

(57) ABSTRACT

A method for generating a report regarding prioritizations of industrial automation devices in an industrial system may include determining a first score for each of the industrial automation devices. The first score represents a relative importance of each of the industrial automation devices. The method may also include determining a second score for each of one or more parts of each of the industrial automation devices. The second score represents a relative importance of each of the parts with respect to each other. The method may also include generating the report comprising the parts, the industrial automation devices, the first score for each of the industrial automation devices, the second score for each of the parts, or any combination thereof, wherein the report is organized according to the first score, the second score, or based on a combination of the first score and the second score.

20 Claims, 8 Drawing Sheets

| Item Number | Repairability | Tech Segment | Machine Reliability | Machine Priority Ranking | Machine Expected Life | Product Category | Support | MTTR Record | Downtime Cost | Part Score | Average Machine Part Score | Machine Score | Equipment Prioritization Score |
|---|---|---|---|---|---|---|---|---|---|---|---|---|---|
| HMI 1 | CONSUME | PLC | Excellent | Low | <5 | MEDIUM | In Hours | <30 mins | <$1,000 | 1.05 | 1.09 | 1.00 | 2.09 |
| HMI 2 | REPAIR | PLC | Excellent | Low | <5 | MEDIUM | In Hours | <30 mins | <$1,000 | 1.32 | 1.09 | 1.00 | 2.09 |
| PANEL 1 | REPAIR | HOT | Excellent | Low | <5 | MEDIUM | In Hours | <30 mins | <$1,000 | 1.32 | 1.09 | 1.00 | 2.09 |
| PANEL 2 | CONSUME | PLC | Excellent | Low | <5 | MEDIUM | In Hours | <30 mins | <$1,000 | 1.05 | 1.09 | 1.00 | 2.09 |
| MIXER 1 | REPAIR | PLC | Excellent | Low | <5 | MEDIUM | In Hours | <30 mins | <$1,000 | 1.32 | 1.09 | 1.00 | 2.09 |
| MIXER 2 | REPAIR | HOT | Excellent | Low | <5 | MEDIUM | In Hours | <30 mins | <$1,000 | 1.32 | 1.09 | 1.00 | 2.09 |
| DRIVE 1 | CONSUME | PLC | Excellent | Low | <5 | MEDIUM | In Hours | <30 mins | <$1,000 | 1.05 | 1.10 | 1.00 | 2.10 |
| DRIVE 2 | REPAIR | PLC | Excellent | Low | <5 | MEDIUM | In Hours | <30 mins | <$1,000 | 1.32 | 1.10 | 1.00 | 2.10 |

*FIG. 9*

SYSTEMS AND METHODS FOR MAINTAINING EQUIPMENT IN AN INDUSTRIAL AUTOMATION ENVIRONMENT

CROSS-REFERENCE TO RELATED APPLICATIONS

This is a continuation application of U.S. Non-Provisional application Ser. No. 15/043,936, entitled "Systems And Methods For Maintaining Equipment In An Industrial Automation Environment," filed Feb. 15, 2016, which claims priority from and the benefit of U.S. Provisional Application Ser. No. 62/139,182, entitled "Systems and Methods for Exchanging Information Between Devices in an Industrial Automation Environment," filed Mar. 27, 2015, each of which is hereby incorporated by reference in their entirety for all purposes.

This application also claims priority from and the benefit of U.S. Provisional Application Ser. No. 62/256,490, entitled "Systems and Methods for Maintaining Equipment in an Industrial Automation Environment," filed Nov. 17, 2015, which is hereby incorporated by reference in its entirety.

BACKGROUND

The present disclosure relates generally to maintaining industrial automation equipment in an industrial automation system using a communication architecture that enables the equipment to share information with each other, certain computing devices, and a cloud-based computing system.

BRIEF DESCRIPTION

Generally, the present disclosure discusses numerous concepts regarding how devices in an industrial automation environment may exchange information with each other and use this shared information to assist users in the industrial automation environment to manage the operations and maintenance of the devices. In one embodiment, the devices in the industrial automation system may include a communication architecture that is structured according to a tri-partite paradigm that facilitates communications between a device, a computing device, and a cloud-based computing system. The information shared within this tri-partite structure may enable machines to operate more efficiently, users to perform their tasks more efficiently, and generally provide for improved operations of an industrial automation system.

In one embodiment, the computing device may receive equipment information regarding an industrial automation system, such as an industrial plant. The equipment information may include a list of each type of industrial automation device that may be present in the system, catalog or serial numbers associated with each industrial automation device, and other types of identifying information related to each industrial automation device. In addition to receiving this equipment information, the computing device may receive various other types of information regarding each industrial automation device. For instance, the computing device may receive reliability information, priority information, life expectancy information, location information, inventory information, or process line information regarding each industrial device. In addition to the information mentioned above, the computing device may receive additional information related to the industrial automation devices or parts of the industrial automation devices via a control system or device that may be part of the industrial automation device, the cloud-based computing system, or both.

Using this collection of information, the computing device may generate one or more reports that characterizes each industrial automation device with respect to a selectable attribute such as reliability, priority, life expectancy, location, process line location, or the like. The computing device may also generate service recommendations to ensure that the industrial automation devices operates efficiently while maximizing their respective life expectancies based on the collected information. In one embodiment, the computing device may generate notifications or software update requests based on the collected information. Additional details regarding the computing device and the operations that the computing device may perform will be discussed with reference to FIGS. 1-9 below.

DRAWINGS

These and other features, aspects, and advantages of the present invention will become better understood when the following detailed description is read with reference to the accompanying drawings in which like characters represent like parts throughout the drawings, wherein:

FIG. 9 illustrates an example report generated based on the equipment prioritization score, in accordance with embodiments presented herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are generally directed towards a tri-partite paradigm or communication network between at least three devices that enables information regarding an industrial automation system to be exchanged between one or more devices of the system more efficiently. The devices of the communication network may include, in one example, a computing device, automation equipment or machinery operating in an industrial automation system, and a cloud-based computing system communicatively coupled to the computing device and the equipment in the industrial automation system. In one embodiment, this tri-partite paradigm may involve a software application operating on a computing device, such that the software application may be used to monitor, control, access, or view automation equipment in an industrial automation system. In any case, the information collected by the computing device and the automation equipment in the industrial automation system may be transmitted to the cloud-based computing system, such that the cloud-based computing system may analyze the information or alert other devices in the industrial automation system of relevant information. As such, the cloud-based computing system may coordinate the exchange of information between various devices associated with the industrial automation system, such that various tasks and operations of the industrial automation system may be performed more efficiently.

Figure 1:
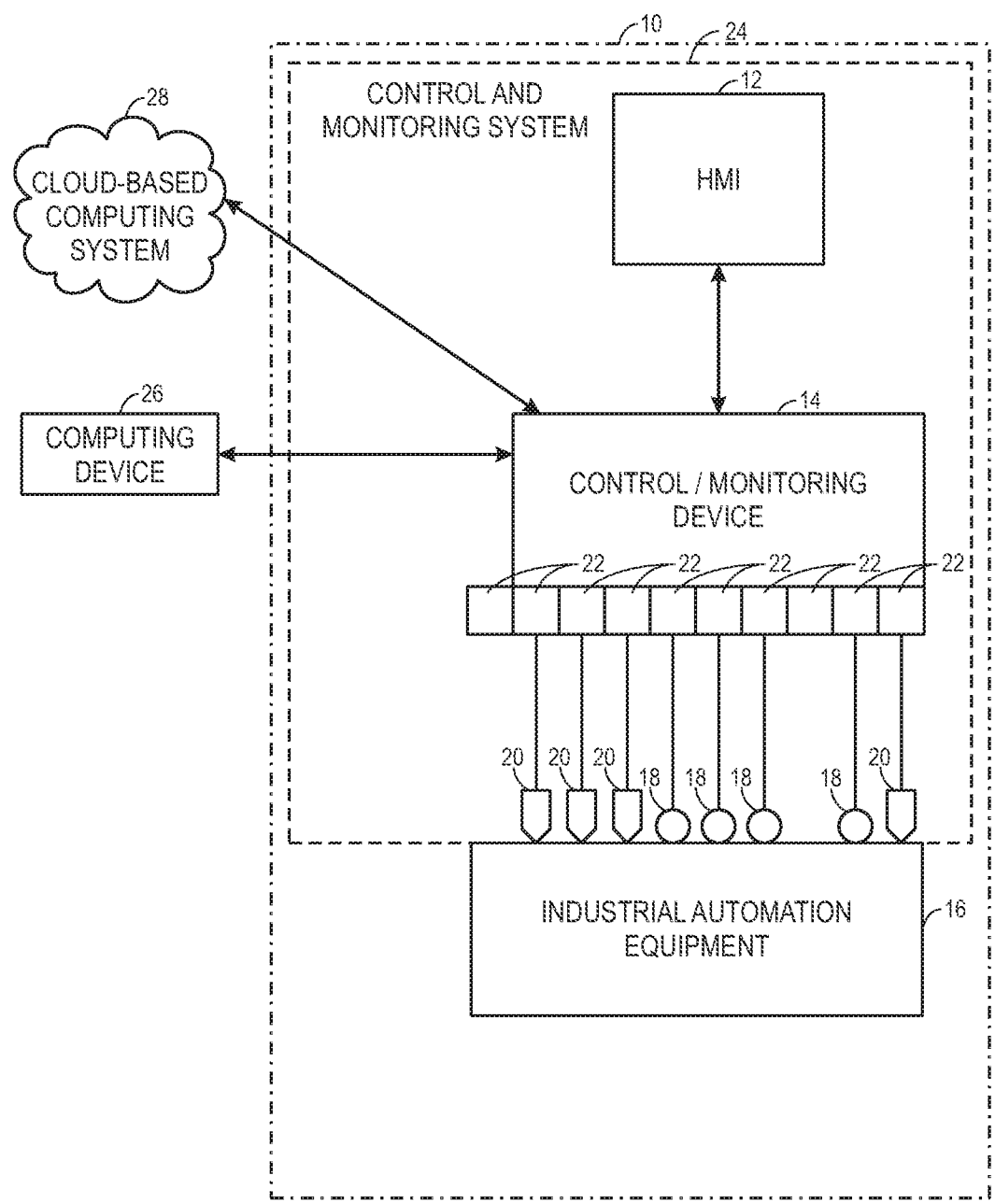
FIG. 1 is a diagrammatical representation of an exemplary control and monitoring system, in accordance with embodiments presented herein.

FIG. 1 is a diagrammatical representation of an exemplary control and monitoring system 10, in accordance with embodiments presented herein. In FIG. 1, the control and monitoring system 10 is illustrated as including a human machine interface (HMI) 12 and a control/monitoring device 14 or automation controller adapted to interface with devices that may monitor and control various types of industrial automation equipment 16. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling, and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include controllers, input/output (I/O) modules, motor control centers, motors, human machine interfaces (HMIs), operator interfaces, contactors, starters, sensors 18, actuators 20, drives, relays, protection devices, switchgear, compressors, sensor, actuator, firewall, network switches (e.g., Ethernet switches, modular-managed, fixed-managed, service-router, industrial, unmanaged, etc.) and the like.

In certain embodiments, one or more properties of the industrial automation equipment 16 may be monitored and controlled by certain equipment for regulating control variables used to operate the industrial automation equipment 16. For example, sensors 18 and actuators 20 may monitor various properties of the industrial automation equipment 16 and may adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP, ControlNet, DeviceNet, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28.

Figure 2:
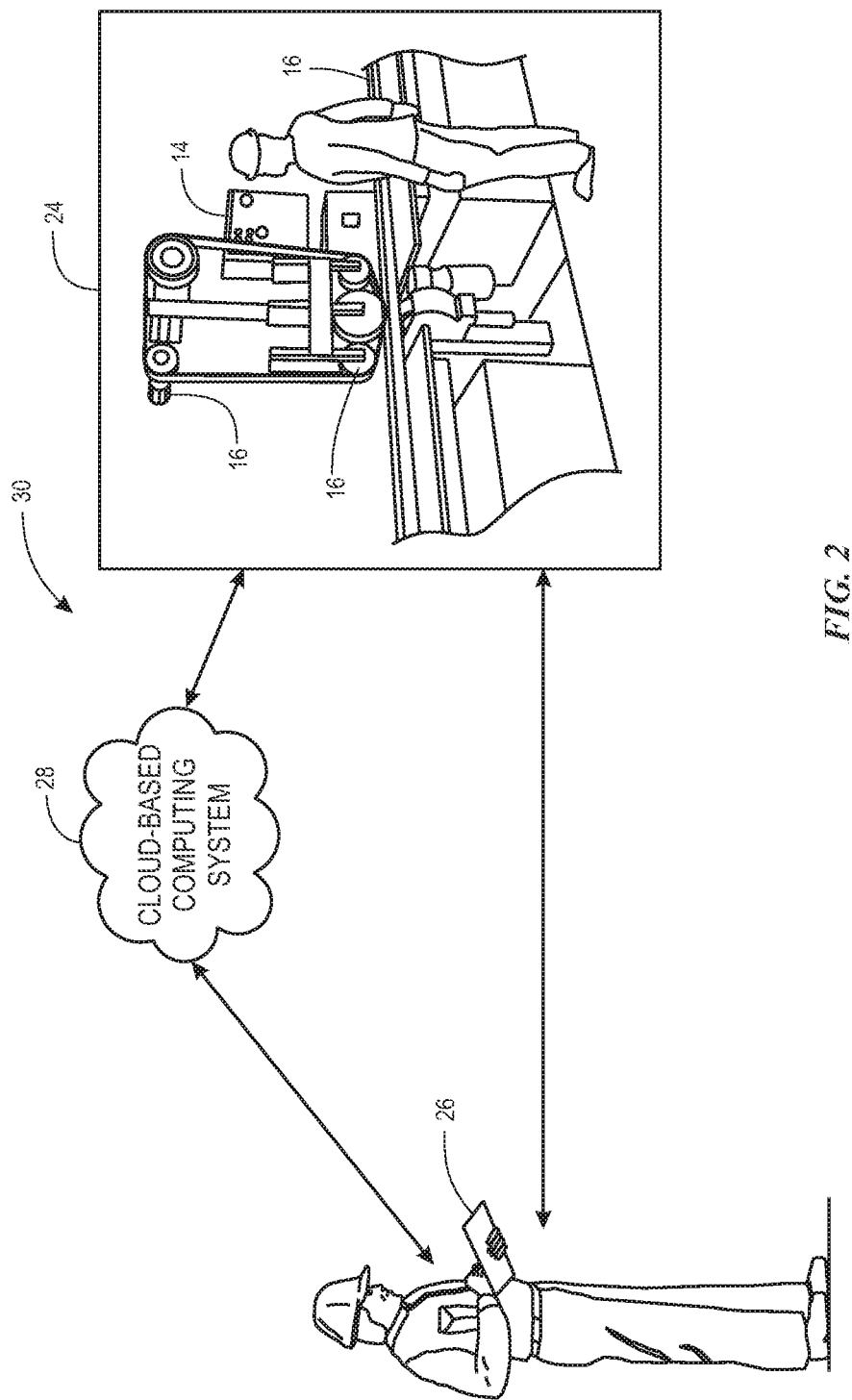
FIG. 2 is a schematic representation of a communication network that enables devices to communicate with each other within an industrial application, in accordance with embodiments presented herein.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like. Additional details regarding the computing device 26 will be discussed below with reference to FIG. 3.

In addition to communicating with the industrial automation equipment 16, the computing device 26 may also communicate with the cloud-based computing system 28. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16 and the computing device 26. As such, the cloud-based computing system 28 may be capable of wired or wireless communication between the industrial automation equipment 16 and the computing device 26. In one embodiment, the cloud-based computing system 28 may be accessible via the Internet or some other network.

After establishing a communication connection between the computing device 26 and the industrial automation equipment 16 (e.g., via an associated control/monitoring device 14 or computing device of the industrial automation equipment 16), the cloud-based computing system 28 may receive data acquired by the computing device 26 and the industrial automation equipment 16. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment, or the like. As such, the cloud-based computing system 28 may maintain a communication connection with various industrial automation equipment 16, computing devices 26, and the like. Additional details regarding the cloud-based computing system 28 will be discussed below with reference to FIG. 4.

Figure 3:
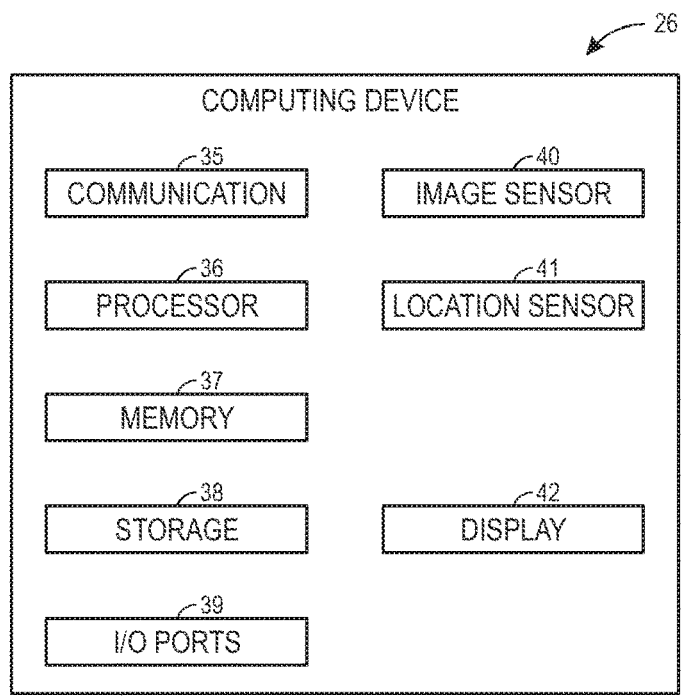
FIG. 3 is a block diagram of example components within a computing device that is part of the communication network of FIG. 2, in accordance with embodiments presented herein.

FIG. 3 is a block diagram of example components within the computing device 26 that is part of the communication network 30, in accordance with embodiments presented herein. For example, the computing device 26 may include a communication component 35, a processor 36, a memory 37, a storage 38, input/output (I/O) ports 39, an image sensor 40 (e.g., a camera), a location sensor 41, a input/display 42, additional sensors (e.g., vibration sensors, temperature sensors) and the like. The communication component 35 may be a wireless or wired communication component that may facilitate communication between the industrial automation equipment 16, the cloud-based computing system 28, and other communication capable devices (e.g., apparatuses described below).

The processor 36 may be any type of computer processor or microprocessor capable of executing computer-executable code. The processor 36 may also include multiple processors that may perform the operations described below. The memory 37 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 36 to perform the presently disclosed techniques. Generally, the processor 36 may execute software applications that include programs that enable a user to track and/or monitor operations of the industrial automation equipment 16 via a local or remote communication link. That is, the software applications may communicate with the control/monitoring device 14 and gather information associated with the industrial automation equipment 16 as determined by the control/monitoring device 14, via sensors disposed on the industrial automation equipment 16, and the like.

The memory 37 and the storage 38 may also be used to store the data, analysis of the data, the software applications, and the like. The memory 37 and the storage 38 may represent non-transitory computer-readable media (e.g., any suitable form of memory or storage) that may store the processor-executable code used by the processor 36 to perform various techniques described herein. It should be noted that non-transitory merely indicates that the media is tangible and not a signal.

In one embodiment, the memory 37 and/or storage 38 may include a software application that may be executed by the processor 36 and may be used to monitor, control, access, or view one of the industrial automation equipment 16. As such, the computing device 26 may communicatively couple to industrial automation equipment 16 or to a respective computing device of the industrial automation equipment 16 via a direct connection between the devices or via the cloud-based computing system 28.

The I/O ports 39 may be interfaces that may couple to other peripheral components such as input devices (e.g., keyboard, mouse), sensors, input/output (I/O) modules, and the like. I/O modules may enable the computing device 26 to communicate with the industrial automation equipment 16 or other devices in the industrial automation system via the I/O modules.

The image sensor 40 may include any image acquisition circuitry such as a digital camera capable of acquiring digital images, digital videos, or the like. The location sensor 41 may include circuitry designed to determine a physical location of the computing device 26. In one embodiment, the location sensor 41 may include a global positioning system (GPS) sensor that acquires GPS coordinates for the computing device 26. In another embodiment, the location sensor 41 may include other circuitry such as a radio wave transmitter, an infrared sensor, and the like that may acquire data that may be used to determine a location of the computing device 26 with respect to other industrial automation equipment 16 or other fixtures in the industrial automation system. In certain embodiments, the computing device 26 may also include various other sensors that may provide additional data related to an environment in which the computing device 26 exists. For instance, the other sensors may include an accelerometer, a gas (e.g., smoke, carbon monoxide) sensor, or the like.

The display 42 may depict visualizations associated with software or executable code being processed by the processor 36. In one embodiment, the display 42 may be a touch display capable of receiving inputs (e.g., parameter data for operating the industrial automation equipment 16) from a user of the computing device 26. As such, the display 42 may serve as a user interface to communicate with the industrial automation equipment 16. The display 42 may be used to display a graphical user interface (GUI) for operating the industrial automation equipment 16, for tracking the maintenance of the industrial automation equipment 16, performing various procedures (e.g., lockout tagout, placing device offline, replacing component, servicing device) for the industrial automation equipment 16, and the like. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the industrial automation equipment 16 or for a number of pieces of industrial automation equipment in the industrial application 24, to control the general operations of the industrial application 24. In some embodiments, the operator interface may be characterized as the HMI 12, a human-interface machine, or the like.

Although the components described above have been discussed with regard to the computing device 26, it should be noted that similar components may make up the control/monitoring device 14. Moreover, the computing device 26 may also be part of the industrial automation equipment 16, and thus may monitor and control certain operations of the industrial automation equipment 16. Further, it should be noted that the listed components are provided as example components and the embodiments described herein are not to be limited to the components described with reference to FIG. 3.

Figure 4:
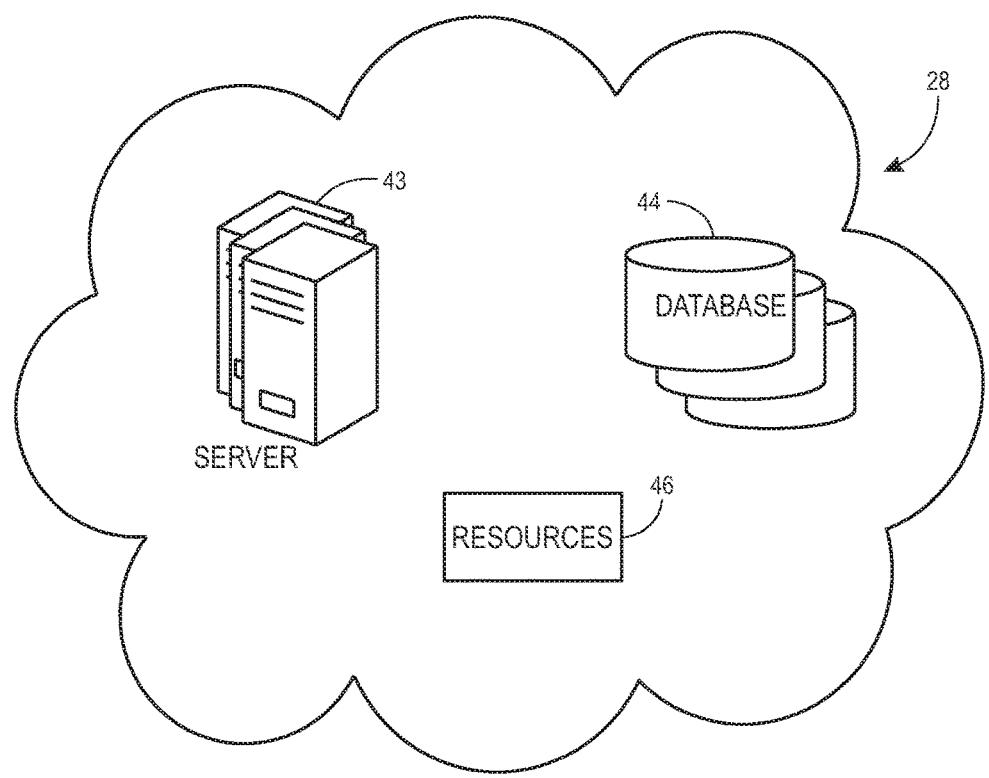
FIG. 4 is a block diagram of example components within a cloud-based computing system of the communication network of FIG. 2, in accordance with embodiments presented herein.

FIG. 4 is a block diagram of example components within the cloud-based computing system 28 of the communication network 30 of FIG. 2, in accordance with embodiments presented herein. As mentioned above, the cloud-based computing system 28 may include a number of computing devices, such as servers 43 that may be communicatively coupled to each other and may distribute various tasks between each other to perform the tasks more efficiently. In certain embodiments, each server 43 may include the example components described above as part of the computing device 26 in FIG. 3.

The cloud-based computing system 28 may also have access to a number of databases 44. The databases 44 may be related to various aspects of the industrial automation system, the industrial automation equipment 16, the computing device 26, operators of the computing device 26 or the industrial automation equipment 16, or the like. For example, the databases 44 may include information regarding procedures for operating and/or maintaining the industrial automation equipment 16. The procedures, as such, may include steps to perform, tools to use, personal protective equipment to wear, and the like with regard to the operations being performed.

The databases 44 may also include information regarding various regulations related to how the industrial automation equipment 16 should be maintained or operated. Additionally, the regulations may be related to how maintenance operations should be documented by the user of the computing device 26. The databases 44 may also include data related to warranty information for the industrial automation equipment 16, service contact information related to the industrial automation equipment 16, manuals for operating the industrial automation equipment 16, and other information that may be useful to an operator of the industrial automation equipment 16. The databases 44 may also include relevant information regarding parts used in the industrial automation equipment 16. The relevant information may include whether the parts are still available, part of an inventory associated with the user or owner of the industrial automation equipment 16 or the like.

In certain embodiments, the cloud-based computing system 28 may also include access to various resources 46. The resources 46 may be a database or collection of published documents or webpages that may be related to the industrial automation equipment 16. As such, the resources 46 may be accessed by the cloud-based computing system 28 available via the Internet or other communication networks. The cloud-based computing system 28 may search or consult the resources 46 to acquire data related to the industrial automation equipment 16. For instance, the resources 46 may provide information regarding product recalls or safety concerns related to the industrial automation equipment 16, weather advisory notices for the industrial automation system, and the like. Additionally, the resources 46 may include hardware, software or firmware updates, software patches, vulnerability patches, certificates, and the like.

Figure 5:
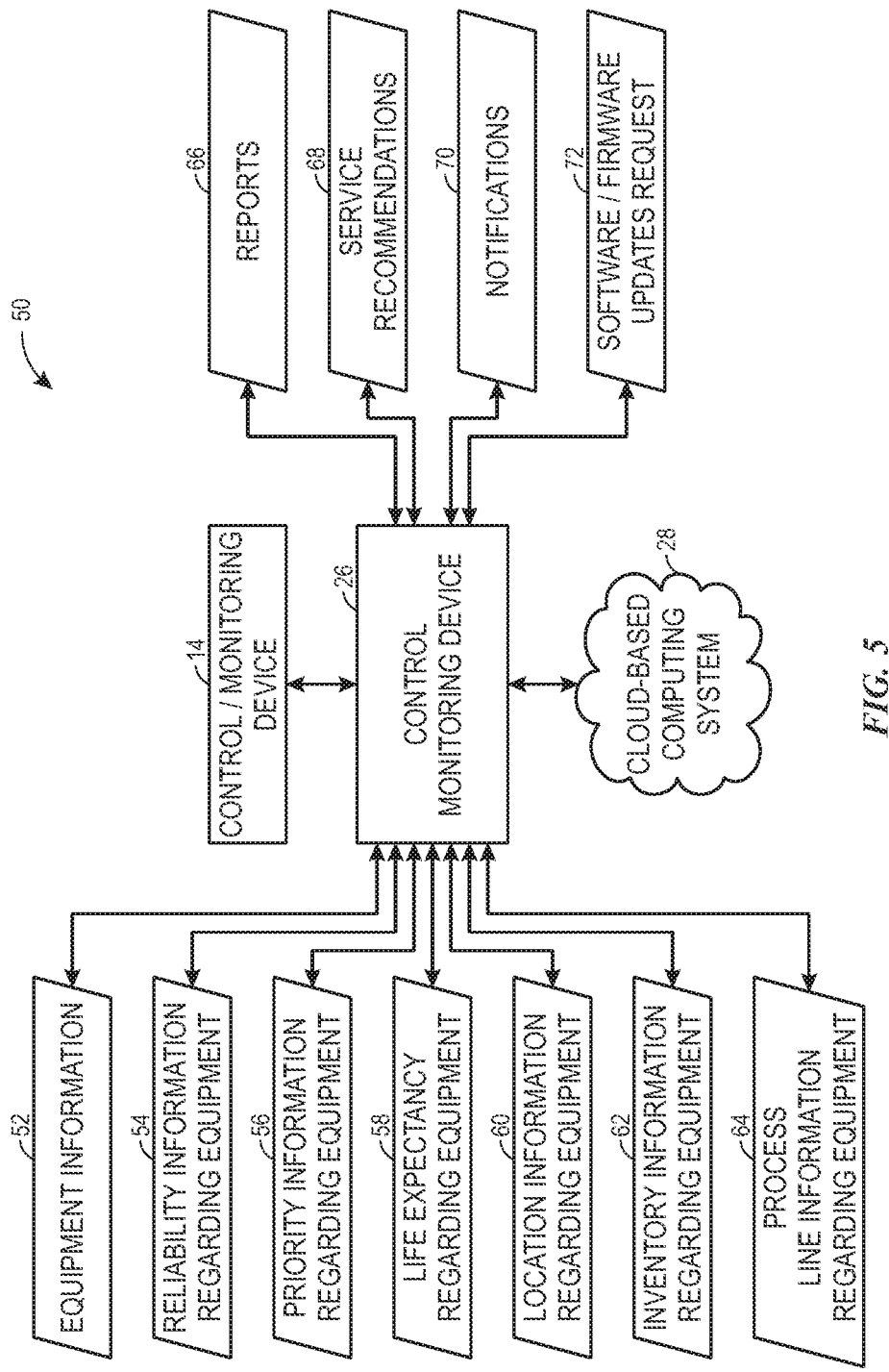
FIG. 5 is a block diagram of example inputs provided to the computing device of FIG. 3 for providing certain outputs to assist in maintaining industrial automation equipment, in accordance with embodiments presented herein.

FIG. 5 is a block diagram 50 of example inputs provided to the computing device of FIG. 3 for providing certain outputs to assist in maintaining industrial automation equipment, in accordance with embodiments presented herein. Although the block diagram 50 indicates that the computing device 26 is receiving the inputs and determining the outputs, it should be noted that, in certain embodiments, the control/monitoring device 14 or the cloud-based computing system 28 may receive the described inputs, perform certain operations or analysis, and generate the outputs described below. Also, in some embodiments, different tasks described below may be performed by different components, such as the computing device 26, the control/monitoring device 14, or the cloud-based computing system 28.

Referring now to FIG. 5, the block diagram 50 illustrates an example of inputs that may be received by the computing device 26, such that the inputs may be analyzed to enable a user of the industrial automation equipment 16 to more efficiently manage the maintenance of the industrial automation equipment 16. With this in mind, the computing device 26 may receive inputs such as equipment information 52, reliability information 54, priority information, 56, life expectancy 58, location information 60, inventory information 62, process line information 64, and the like.

In certain embodiments, the information described below may be manually input into the computing device 26 by a user visiting a facility or plant in which the industrial application 24 takes place. However, it should be noted, that in other embodiments, a computing system, such as the control/monitoring device 14, or a computing system disposed within the industrial automation equipment 16 may provide the information described below to the computing system 26. That is, the computing system may communicate with components disposed on the industrial automation equipment 16 to retrieve the information described below. As such, the information described below may be stored within other computing systems, controllers, electronic tags (e.g., radio frequency identification tags, near-field communication tags), and the like. For example, when a particular industrial automation equipment 16 is placed on online or provided access to a communication network, a computing system associated with the particular industrial automation equipment 16 may broadcast information regarding the particular industrial automation equipment 16. The broadcasted information may then be received by, for instance, the computing device 26 to perform various techniques described herein.

The equipment information 52 may include information regarding each piece of the industrial automation equipment 16 that may be part of the industrial application 24. As such, the equipment information 52 may include information regarding the types of industrial automation equipment 16 present at a facility, a part number for each type of industrial automation equipment 16, a parts list for various parts that make up each type of industrial automation equipment 16, a part number for each item in the part list, a description of each type of industrial automation equipment 16, a description of each item in the part list, a replacement part number for each type of industrial automation equipment 16, a replacement part number for each item in the part list, and the like. The equipment information 52 may also include a cost or price associated with each type of industrial automation equipment 16, each part in the parts list, and each replacement part for teach part in the parts list.

In one embodiment, the equipment information 52 may also include information regarding parts, replacement parts, or additional pieces of the industrial automation equipment 16 that may be present at the facility having the industrial automation equipment 16 as part of the facility's inventory. The information regarding the items included in the facility's inventory may be useful in determining whether proper amounts of spare parts, replacement parts, and pieces of industrial automation equipment 16 are present at the facility to ensure that the industrial application 24 operations efficiently.

The equipment information 52 may also include information regarding the reparability of various pieces of the industrial automation equipment 16. Generally, the reparability may be characterized as repair, exchange, or consume. The repair categorization may indicate that the piece of equipment 16 may be reparable, the exchange categorization may indicate that the piece of equipment is not reparable and should be replaced with another unit, and the consume categorization may indicate that the piece of equipment is not reparable and does not have a suitable replacement unit available. With these categorizations in mind, in certain embodiments, a user may assign different weights or values for each categorization.

For example, the repair categorization may be assigned a value of 0.9, the exchange categorization may be assigned a value of 0.95, and the consume categorization may be assigned a value of 1. As such, as the piece of equipment 16 becomes less reparable, the relative importance of the equipment increases. That is, since a piece of equipment that is not reparable and does not have a suitable replacement may be burdensome to the industrial automation application 24 if the piece of equipment falls into disrepair, it becomes more important to the user of the industrial automation application 24 to plan for the replacement or contingency plan for maintaining the operations of the industrial automation application 24 in the event that the piece of industrial automation equipment 16 fails. As will be described in greater detail below, the computing device 26 may use the weighting factors to prioritize various pieces of industrial automation equipment 16 for planning a lifecycle of the industrial automation application 24, a migration plan for the industrial automation application 24, a replacement schedule for various pieces of equipment 16 in the industrial automation application 24, and the like.

In addition to the reparability of a piece of industrial equipment 16, the equipment information 52 may also provide information regarding a mean time to repair (MTTR) for the pieces of industrial equipment 16. The MTTR categorizations may include, for example, less than 30 minutes, 30 minutes to 2 hours, 2 to 8 hours, and more than 8 hours. In one example, the less than 30 minutes categorization may be valued at 1, the 30 minutes to 2 hours categorization may be valued at 1.05, the 2 to 8 hours categorization may be valued at 1.2, and the more than 8 hours categorization may be valued at 1.4. As such, as the MTTR increase, the relative importance of the piece of equipment 16 increases.

In certain embodiments, the equipment information 52 may also include information related to a downtime cost for the pieces of industrial automation equipment 16 and a corresponding rating or weight for the cost. For instance, the downtime cost may be categorized as less than $1,000, which may be weighted as 1.0, between $1,000 and $5,000, which may be weighted at 1.05, between $5,000 and $10,000, which may be weighted at 1.2, and greater than $10,000, which may be weighted as 1.4.

The equipment information 52 may also include information regarding how pieces of the equipment 16 may be supported. The support type information may include categorizations such as in a house to indicate that personnel associated with the industrial automation system using the piece of equipment is capable of supporting (e.g., repairing, troubleshooting) the piece of equipment 16. Another support type categorization may include a local service provider, which may indicate that another organization not associated with the industrial automation system, but local (e.g., within 50 miles) to the facility of the industrial automation system is capable of supporting the piece of equipment 16. The support type categorizations may also include an original equipment manufacturer (OEM) categorization that indicates that the manufacturer of the piece of equipment 16 will be capable of supporting the equipment 16. Another support type categorization may include a not guaranteed category, which may indicate that support may or may not be available for the piece of equipment 16. The in-house categorization may, in one example, be valued at 1, the local support category may be valued at 1.05, the OEM categorization may be valued at 1.2, and the not guaranteed categorization may be valued at 1.4. As such, as uncertainty regarding the availability of support for a piece of industrial automation equipment 16 increases, the relative importance for the piece of equipment 16 also increases.

In addition to the support type information, the equipment information 52 may also include information related to a technical segment associated with the piece of industrial equipment. The technical segment may be a general categorization regarding the piece of equipment 16 indicating whether the piece of equipment 16 is generally easy to acquire (e.g., low), carried at a local distributor (e.g., normal), not normally carried by a distributor and may involve downtime (e.g., medium), and not stocked or difficult to attain (e.g., high). The technical segments may be related to the type of piece of equipment 16. For example, generally programmable logic controllers (PLCs) may be widely available at various local distributors due to its frequency of use. As such, the PLC-type equipment may be categorized as a low technical segment. On the other hand, a drive that operates using a particular input voltage and provides a particular output voltage may be categorized as a high technical segment that is not stocked and is difficult to attain within a certain period of time (e.g., 1 week).

Like the categorizations described above, the technical segment categorizations may also be weighted according to a particular values. For example, the low technical segment category may be assessed a 1 value, a normal technical segment category may be assessed a 1.05 value, a medium technical segment category may be assessed a value of 1.2, and a high technical segment category may be assessed a value of 1.4. As such, as the technical segment indicates that the piece of equipment 16 is increasingly difficult to acquire, the relative importance of the piece of equipment 16 increases.

The equipment information 52 may also include information regarding a lifecycle categorization for each piece of industrial automation equipment 16. The lifecycle categorization may indicate the level of support or product availability for the piece of equipment 16 that is being offered by the manufacturer of the piece of equipment 16. For instance, the lifecycle categorizations may include an active category that indicates that the piece of industrial automation equipment 16 is the most current product offering by the manufacturer, and thus is fully supported. Another category may include an active-mature category that indicates that the piece of equipment 16 is fully supported by the manufacturer but newer versions or products exist. An end-of-life category may indicate that the manufacturer has announced a discontinued date in which the manufacturer may not produce any more of the respective piece of equipment 16. A not-available category may indicate that information regarding the lifecycle stage of the piece of equipment 16 is not available or is unknown. In one example, the active category may be characterized as having a 1 weight or rating, the active mature category may have a 1.05 rating, the end-of-life category may have a 1.2 rating, a discontinued category may have a 1.4 rating, and a not-available category may have a value of 1. As such, as the manufacturer provides less support for the piece of equipment 16, the relative importance of the piece of equipment 16 may increase.

In certain embodiments, identifying information for the equipment information 52 may be received by the computing system 26 by way of a one-line diagram or a schematic indicating how power may flow through a facility or within the industrial application 24. As such, the computing system 26 may analyze the one-line diagram or the schematic to determine the types of industrial automation equipment 16 are present at the facility. It should be noted that the computing system 26 may also determine the types of industrial automation equipment 16 present at the facility based on other types of diagrams as well, such as a networking diagram, a piping and instrument diagram, and the like.

In another embodiment, the computing device 26 may receive the equipment information 52 by scanning a radio-frequency identification (RFID) tag for each type of industrial automation equipment 16 present at the facility, pinging controllers or other devices that are part of the industrial automation equipment 16 via a network, and the like. After the industrial automation equipment 16 is identified, the computing system 26 may query a database that may include a list of parts and part numbers associated with each respective piece of identified industrial automation equipment 16.

In some cases, as additional pieces of the industrial automation equipment 16 are added to a facility, the control/monitoring device 14 may communicate the addition of the respective piece of the industrial automation equipment 16 to the computing device 26 or the cloud-based computing system 28. As such, the computing device 26 or the cloud-based computing system 28 may have an updated list of the industrial automation equipment 16 present at the facility.

The rating or weight information described above may, in some embodiments, be received from the user via the computing device 26. In some embodiments, the control/monitoring device 14 or the cloud-based computing system 28 may receive user inputs regarding these values. In some cases, the computing device 26, the control/monitoring device 14, or the cloud-based computing system 28 may generate the ratings or weight values for the factors discussed above based on an age of the piece of equipment 16, information available via the servers 43, the databases 44, the resources 46, and other information sources available to the cloud-based computing system 28.

In addition to the equipment information 52, the computing device 26 may receive reliability information 54 regarding the industrial automation equipment 16. The reliability information 54 may characterize the reliability of each piece of industrial automation equipment 16 as a score or some value. The reliability information 54 may be determined based on maintenance records for the respective piece of the industrial automation equipment 16, the downtime of the respective piece of the industrial automation equipment 16 over a certain period of time, reviews provided by other owners of the respective piece of the industrial automation equipment 16 available via the cloud-based computing system 28, empirical data regarding the respective piece of the industrial automation equipment 16, empirical data regarding a similar piece of the industrial automation equipment 16 located at another facility stored in a database accessible via the cloud-based computing system 28, and the like.

In certain embodiments, the reliability information 54 may be characterized from a scale of 1 to 1.4, where 1 indicates that the respective piece of the industrial automation equipment 16 is generally considered to be very reliable. The reliability information 54 may be designated by a user or operator of the piece of the industrial automation equipment 16. As such, the computing device 26 may present the user with certain categories to characterize the piece of industrial automation equipment 16 such as excellent reliability, good reliability, somewhat reliable, and poor reliability.

Each characterization may be associated with a different rating or value. For instance, excellent reliability may be assigned a value of 1, good reliability may be assigned a value of 1.05, somewhat reliable may be assigned a value of 1.2, and unreliable may be provided a value of 1.4. The example values listed above illustrate that as a piece of industrial automation equipment 16 is less reliable, the weight of the reliability rating increases, thus representing a greater importance to the user. Although the characterizations described above are assigned particular values mentioned above, it should be noted that each characterization may be assigned a different value based on a user's preferences. Moreover, it should be noted that the user is not limited to providing values via characterization values. Instead, the user or a computing system may assign a reliability rating using any suitable value that may best represent the reliability of the respective piece of the industrial automation equipment 16.

The computing device 26 may also receive priority information 56 regarding the industrial automation equipment 16. The priority information 56 may characterize or quantify the types of equipment with respect to an importance rating to a respective user. As such, the priority information 56 may provide an assessment of a risk or impact of the respective piece of the industrial automation equipment 16 with respect to the industrial application 24. The priority information 56 may be characterized, for example, as critical, high, medium, or low. Each characterization may be associated with a weighted value (e.g., 1-1.4), such that each piece of the industrial automation equipment 16 may be associated with some quantified value. For example, the priority information 56 may be valued as 1.0 for low priority, 1.05 for medium priority, 1.2 for high priority, and 1.4 for critical priority. Like the reliability ratings, the priority ratings also increase as the priority level increases to represent increased importance to the user.

The priority information 56 may be received from the user since the user may understand the value of each piece of the industrial automation equipment with regard to the industrial application 24. For example, if a drive device becomes inoperable, the user may understand that an entire line of processing may also become inoperable and may cause a delay of a certain number of weeks due to a delay in receiving a replacement piece of equipment. As such, the user may identify the particular drive as a critical piece of equipment and the computing device 26 may associate a relatively high weighted value to this drive as compared to other pieces of the industrial automation equipment 16 present at the respective facility. In the same manner, the user may identify certain programmable logic controllers (PLCs) that are present at the facility as having a low priority because replacement PLCs may be readily available in the user's inventory or at a local distributor that regularly stocks these PLCs.

The priority information 56 may also be associated with a part of a process line or position within a workflow of the industrial application 24. That is, if a respective piece of industrial automation equipment 16 is located within a process line or part of a workflow that directly impacts certain key performance indicators (KPIs) of the industrial application 24, the priority information 56 for the respective piece of the industrial automation equipment 16 may indicate a relatively higher priority as compared to other pieces of the industrial automation equipment 16.

The priority information 56 may also be determined based on an estimated cost to replace the respective piece of the industrial automation equipment 16. Additionally, the priority information 56 may be based on an expected loss of operating hours, expected downtime in production, loss in production, and the like associated with the loss of the respective piece of the industrial automation equipment 16. For instance, the priority information 56 may be associated with a total monetary value of throughput of a particular work process of the facility for the respective piece of industrial automation equipment 16.

The computing device 26 may also receive life expectancy information 58 regarding each respective piece of the industrial automation equipment 16. The life expectancy information 58 may indicate an amount of time in which a respective piece of the industrial automation equipment 16 may continue to exist or operation within the facility. The life expectancy information 58 may be related to a total number of hours that the respective piece of the industrial automation equipment 16 has been in service and an expected amount of service time before maintenance value. Generally, the life expectancy information 58 may be characterized as less than five years, five to ten years, and more than ten years. Using these characterizations, less than five years may be valued at 1.3, five to ten years may be valued at 1.15, and more than ten years may be valued at 1. As such, as the expected life increases, the rating for the expected life categorizations may decrease. In certain embodiments, the life expectancy information 56 may be received via databases accessible by the cloud-based computing system 28 or the like. Moreover, it should be noted that, in certain embodiments, the ratings for the different life expectancy categorizations may be valued differently as per a user's preferences.

In some instances, the user of the facility may decide to migrate out of a particular type of technology within some time frame. As such, if the respective piece of the industrial automation equipment 16 is part of the migration plan, the life expectancy information 58 may be updated to correspond to a plan for when the respective piece of the industrial automation equipment 16 may be migrated from the facility. In certain embodiments, the life expectancy information 58 may be characterized according to time, such as under five years, five to ten years, more than ten years, and the like.

The computing device 26 may also receive location information 60 regarding each respective piece of the industrial automation equipment 16 within the facility. The location information 60 may specify an area or portion within the industrial application 24 that corresponds to a function within the industrial application 24. For instance, the industrial application 24 may correspond to a product manufacturing facility that fills cans with a product and packages cans for shipment. As such, the facility may be logically divided into a manufacturing portion and a packaging portion. The location information 60 in this example may indicate whether each piece of the equipment 16 is within the manufacturing area or the packaging area. In some embodiments, a control device or computing system associated with each piece of equipment 16 may be aware of its location within the industrial application 24 and may send the location information 60 to the computing device 26 or the like.

The location information 60 may also indicate a physical location of each respective piece of the industrial automation equipment 16 within the facility. As such, the location information 60 may provide spacing information between each respective piece of the industrial automation equipment 16, a layout of how each respective piece of the industrial automation equipment 16 is positioned within the facility, and the like. By knowing the types of the industrial automation equipment 16 that surround each respective piece of the industrial automation equipment 16, the computing device 26 may be able to analyze or ascertain various risks to certain pieces of the industrial automation equipment 16 due to their respective proximities to other pieces of the industrial automation equipment 16. For example, if a drive device is located near a cooking unit, the computing device 26 may determine that the average ambient temperature that for the environment in which the drive device is operating may be higher as compared to other drive devices within the facility. This increased temperature may cause additional wear or other conditions for the particular drive device that may not be relevant for other drive devices. Since the location information 60 provides the relative location of each respective piece of the industrial automation equipment 16, the computing device 26 may thus account for additional factors when evaluating how a certain device may be maintained over time.

As mentioned above, the equipment information 52 may include information regarding the inventory present at a facility or at a location that may be useful for the user. This inventory information 62 may also be provided to the computing device 26 as an independent input. The inventory information 62 may also include information regarding whether the equipment or part listed in the inventory is still supported by a manufacturer, still being produced by a manufacturer, has been replaced with an updated version (e.g., software or hardware version), and the like. Each item in the inventory information 62 may be weighted or rated by the user according to the categorizations described above. In one example, the inventory rating for each piece of equipment 16 in the inventory list may depend on whether a spare part is present in the inventory or not. For example, if a spare is available, the inventory rating may be 0.85, whereas if the spare is not available, the inventory rating may be 1. As such, a higher relative importance may be assigned to the piece of equipment 16 that has a spare available in the inventory, as compared to the piece of equipment 16 that does not have a spare available.

The computing device 26 may also receive process line information 64 regarding each respective piece of the industrial automation equipment 16. The process line information 64 may indicate a part of a workflow of the industrial application 24. That is, a facility may include a number of work areas or work lines that may perform different functions. The process line information 64 may indicate a relative part of an overall workflow process in which each respective piece of the industrial automation equipment 16 may be located. As such, the computing device 26 may consider the location of each respective piece of the industrial automation equipment 16 within the overall workflow of the facility when determining how to maintain various pieces of the industrial automation equipment 16. For instance, a drive device may be part of a packaging process line for a facility that manufacturers and produces different types of cookies. In this example, if each process line associated with producing each type of cookie feeds into one process line for packaging, the computing device 26 may assess a value for the drive device that is part of the packaging process line as being higher than other drive devices that do not support the packaging process line because all of the other producing lines feed into the packaging line. In some embodiments, a user may specify to the computing device 26 or the like a value or weight for each process line indicating a respective value or importance of each process line with respect to the industrial application 24.

After receiving one or more of the information types discussed above, the computing device 26 may analyze the information and provide a set of outputs that may assist a user in managing the operations and maintenance of the industrial automation equipment 16. For instance, the computing device 26 may generate reports 66, service recommendations 68, notifications 70, and software/firmware updates request 72 regarding the industrial automation equipment 16.

The reports 66 may include a collection of the information acquired by the computing device 26. The reports 66 may include an inventory analysis report indicates the number of and types of industrial automation equipment 16 present at the facility. In one embodiment, upon generating the inventory analysis report, the computing device 26 may generate recommendations regarding a number of spare parts that should be maintained for each piece of the industrial automation equipment 16. As such, the computing device 26 may analyze the inventory information 62 to determine whether the inventory levels for each piece of the industrial automation equipment 16 is available.

The report 66 may also include a lifecycle-based report that may display risk areas within the facility that have older pieces of the industrial automation equipment 16. The risk areas may be organized according to a hierarchy of the facility. In one embodiment, the computing device 26 may identify areas within the facility that may benefit from a migration of equipment or service of equipment.

The reports 66 may also include a detailed production location report, which may detail locations in the facility that certain parts are located. In one embodiment, the user may define the terminology employed by the detailed production report, such that the user may interpret the data in a format that may be easily evaluated. By way of example, the detailed production report may be organized according to a hierarchy of the facility. For instance, the hierarchy may be displayed as the following: Facility Area (Large sections of the facility)—Ex. Processing, Packaging, Shipping etc.
        Location (Work processes in the plant)—Ex. Line 1, Line 2 etc.
            Machine (the machines that make up a work process)
                Panel (the panels that make up a machine)
                    Part (the parts that make up a panel)

The reports 66 may also include environment reports that indicate an environment (e.g., temperature, humidity) that surround the industrial automation equipment 16.

It should be noted that with the overwhelming amount of data available via the computing device 26, the reports 66 may assist a user in organizing the copious amount of data that arise with respect to systems rooted in computer-technology. That is, as data has become more available via network and Internet communications, the ability for a user to process the large amounts of data in a digestible format, such as that provided by the report 66, may provide an efficient solution to maintaining the equipment 16 in view of the large amounts of data.

In addition to the reports 66, the computing device 26 may provide service recommendations 68 regarding the industrial automation equipment 16. In certain embodiments, the service recommendations 68 may be determined based on the inputs received by the computing device 26 mentioned above. For example, the computing device 26 may receive the equipment information 52, the reliability information 54, and the priority information 56 and determine a risk score or value for each piece of the industrial automation equipment 16. The risk score may be determined based on a relative importance of each piece of the industrial automation equipment 16 with respect to the part of the workflow that each piece of the industrial automation equipment 16 participates in, the reliability of each piece of the industrial automation equipment 16, and the priority designated to each piece of the industrial automation equipment 16. Using the risk score, the computing device 26 may generate recommendations for servicing or replacing various pieces of the industrial automation equipment 16 in accordance to the calculated risk or priority level.

Service recommendations 68 may also include recommendations to move positions or locations of various pieces of the industrial automation equipment 16 in view of the location information 60 and efficiency concerns determined by the computing device 26.

In one embodiment, the service recommendations 68 may also include an alternative plan or approach to perform a service on pieces of the industrial automation equipment 16. For instance, if the computing device 26 receives a plan or request to place a piece of the industrial automation equipment 16 offline to perform a maintenance operation, the computing device 26 may determine whether the plan may be performed at an alternate time or in an alternate manner based on the process line information 64, the inventory information 62, or the like. That is, if the computing device 26 determines that a replacement item exists in the inventory and that the piece of the industrial automation equipment 16 to be serviced is part of a high priority process line according to the process line information 64, the computing device 26 may recommend switching the piece of the industrial automation equipment 16 being serviced with a replacement item and then servicing the piece of the industrial automation equipment 16. As such, the computing device 26 may assist in minimizing an amount of time that the respective process line may be offline, thereby increasing the efficiency in production at the facility.

The service recommendations 68 may assist a user in identifying which pieces of the industrial automation equipment 16 to maintain or replace in accordance with a priority of the facility. That is, the service recommendations 68 may assist a user in determining which pieces of the industrial automation equipment 16 should be addressed first and thereafter.

The computing device 26 may also generate notifications 70 based on the received inputs. In one embodiment, after receiving the inputs described above, the computing device 26 may access the cloud-based computing system 28 to perform some analysis regarding the industrial automation equipment 16 in view of information available via the database 44, the resources 46, or the like. For instance, upon receiving the inventory information 60, the computing device 26 may determine whether the user has a sufficient number of spare parts for various pieces of the industrial automation equipment 16. The sufficient number of spare parts may be determined based on information available via the cloud-based computing system for other similar pieces of the industrial automation equipment 16 and an expected usage of the spare parts.

The notifications 70 may also include details regarding whether parts or pieces of the industrial automation equipment 16 are being discontinued, have been replaced with newer versions, or the like. As such, the computing device 26 may receive updated information regarding the status of each part of the inventory or each piece of the industrial automation equipment 16 via the cloud-based computing system 28, which may receive data concerning these matters from a manufacturer, distributor, or the like.

In the same manner, the computing device 26 may generate software or firmware update requests 72 based on the received inputs and the information available via the cloud-based computing system 28. In one embodiment, upon determining that a software or firmware update is available for a piece of the industrial automation equipment 16 present in the facility, the computing device 26 may push the software update from the cloud-based computing system 28 to the control/monitoring device 14 or another piece of circuitry.

Figure 6:
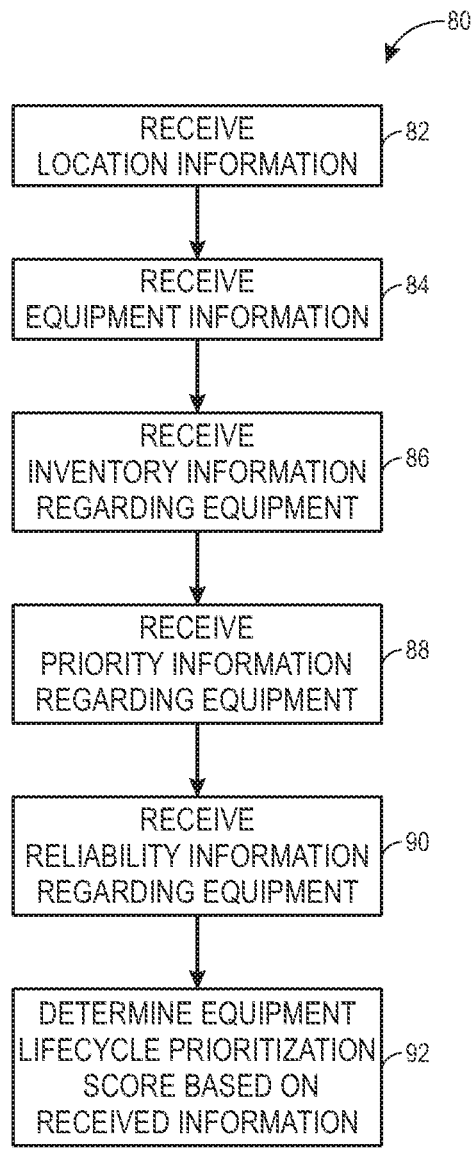
FIG. 6 is a flow chart of a method for determining a prioritization score for various pieces of the industrial automation equipment, in accordance with embodiments presented herein.

With the foregoing in mind, FIG. 6 illustrates a flow chart of a method 80 for determining a prioritization score for various pieces of the industrial automation equipment 16, in accordance with embodiments presented herein. Although the following description of the method 80 is described as being performed by the computing device 26, it should be noted that the method 80 may be performed using any suitable processor-based system. Moreover, although the following description of the method 80 is described as being performed in a particular order, it should be noted that the method 80 may be performed in any suitable order. Generally, the information received by the computing device 26 mentioned below is described in greater detail above with respect to the discussion regarding FIG. 5.

Referring now to FIG. 6, at block 82, the computing device 26 may receive location information 60 regarding each piece of the industrial automation equipment 16 in the industrial application 24. As such, the computing device 26 may receive an area designation within the industrial application 24, the process line information 64, and other information described above regarding the location of each piece of the industrial automation equipment 16. In one embodiment, the information received at block 82 may indicate a rating or value associated with the details of area or process line that corresponds to each piece of equipment 16. Generally, a user may specify the weight or rating, which corresponds to a relative importance of the specified location with respect to other locations within the industrial application 24. In some cases, the computing device 26 may determine a weight for each designated location based on a value of the equipment within the area, the proportion of industrial processing time (e.g., manufacturing of products, preparation of products, packaging of products) is associated with the respective area, and the like.

At block 84, the computing device 26 may receive the equipment information 52 regarding each piece of the industrial automation equipment 16 within the industrial application 24. As such, the computing device 26 may receive an identification (e.g., product name, number) of a machine that corresponds to the industrial automation equipment 16, as well as an identification (e.g., part name, number) of each asset within the respective machine. In some cases, the identification of the machine or the asset may be a general industry standard characterization (e.g., dry-mix packaging, case erector, remote panel, human machine interface, etc.). As such, the computing device 26 may also receive information regarding a manufacturer, a part number, a description, and the like regarding each piece of the industrial automation equipment 16.

As part of the equipment information 52, the computing device 26 may receive information regarding the reparability, the technical segment, and lifecycle for each piece of the industrial automation equipment 16. Generally, the reparability, the technical segment, and lifecycle information may be related to assets or parts that make up a larger machine, such as a drive, a conveyor belt, a motor, or the like. The assets may correspond to various parts that may be used to enable the machine to operate such as a human-machine interface, a PLC, and the like.

Also part of the equipment information 52, the computing device 26 may receive expected mean time to repair information, expected life information, support information, and expected machine downtime information regarding each piece of the industrial automation equipment 16. Generally, the expected mean time to repair information, expected life information, support information, and expected machine downtime information may be associated with machines that are used to perform various tasks within the industrial application 24.

In addition to the equipment information 52, the computing device 26, at block 86, may receive the inventory information 62 regarding the equipment 16. As such, the computing device 26 may receive data regarding whether spare parts are available on site or in an inventory for each piece of the industrial automation equipment 16. As mentioned above, the inventory information 62 may indicate a weight or rating based on whether a spare piece of equipment 16 is available or not.

At block 88, the computing device 26 may receive priority information 54 regarding each piece of the industrial automation equipment 16. As discussed in detail above with regard to FIG. 5, the priority information 54 may indicate a relative importance for each piece of the industrial automation equipment 16 with respect to other pieces of the industrial automation equipment 16. In the same manner, at block 90, the computing device 26 may receive the reliability information 54 discussed above. As such, the computing device 26 may receive weights or ratings for each piece of the industrial automation equipment 16.

After receiving the information regarding the equipment 16 discussed above, at block 92, the computing device 26 may determine a prioritization score for each piece of the equipment 16 based on the received data. In one embodiment, the prioritization score for the piece of industrial equipment 16 may be determined based on an analysis of a part or asset score and a machine score. As discussed above, a machine may represent any suitable type of industrial automation equipment 16 that is composed or made up of a number of parts or assets. Using the inventory information 62, the reparability information, the technical segment information, and the lifecycle information discussed above, the computing device 26 may determine a part score for each part or asset item of the industrial automation equipment 16. In the same manner, using the expected life information, the expected mean time to repair information, the reliability information, the priority information, the support information, and the expected machine down time information regarding machine items of the industrial automation equipment 16, the computing device 26 may determine a machine score. The computing device 26 may then combine the machine score for a particular machine and the part scores for the parts that make up the machine to determine a combined score that corresponds to the prioritization score for the machine. Keeping the foregoing in mind, additional details regarding how the part score, the machine score, and the combined score are determined are discussed below.

Figure 7:
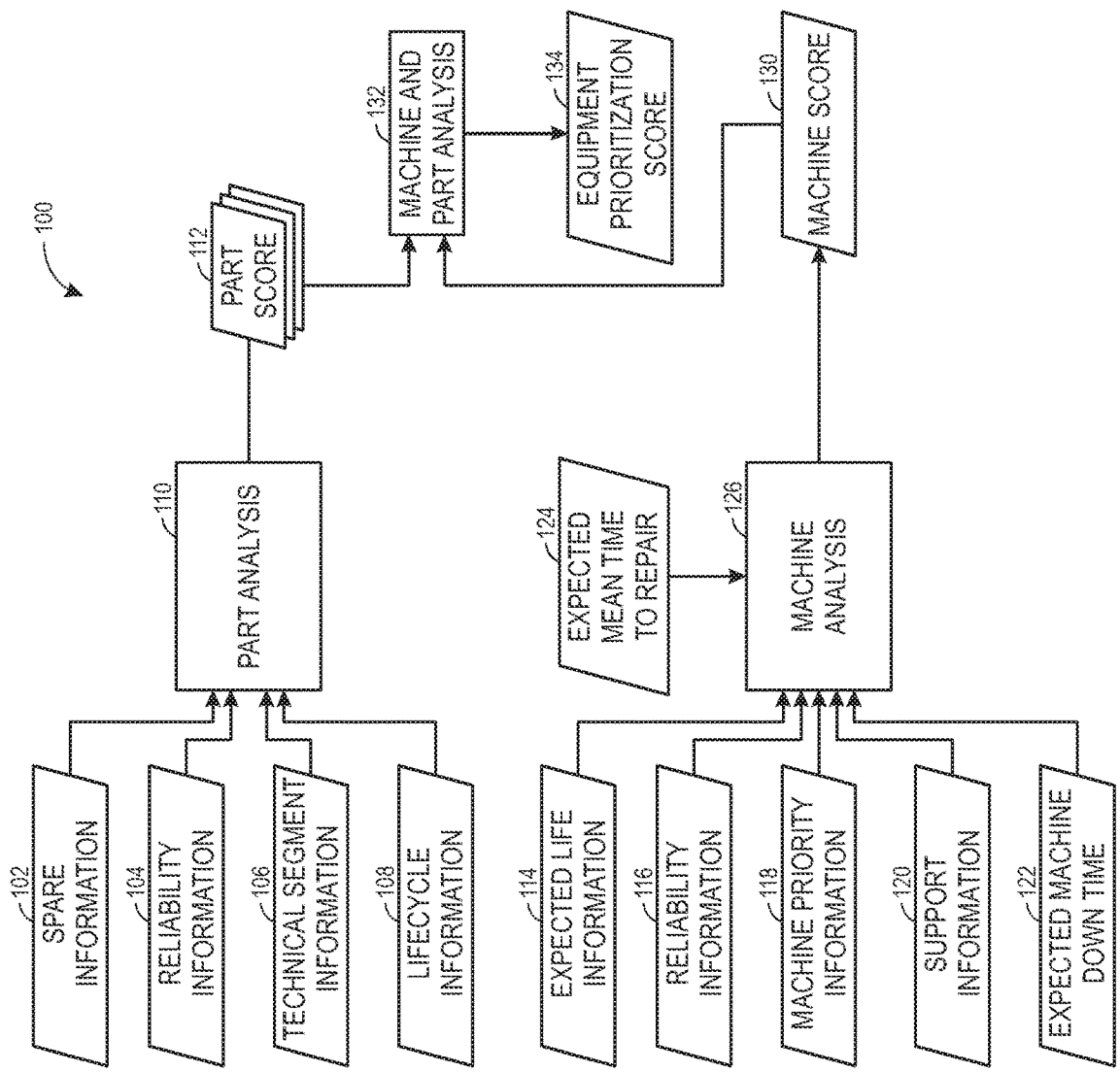
FIG. 7 illustrates a data flow diagram for determining an equipment prioritization score based on information received via the computing device of FIG. 3, in accordance with embodiments presented herein.

FIG. 7 illustrates a data flow diagram 100 for determining an equipment prioritization score based on information received via the computing device 26, in accordance with embodiments presented herein. The data flow diagram 100 may represent how certain inputs are received by a software application operating in the computing device 26 to determine the equipment prioritization score according to the method 80 of FIG. 6. Although the data flow diagram 100 is described as being implemented by the computing device 26, it should be noted that any suitable computing system may implement the data flow diagram 100.

Generally, as discussed above, the equipment prioritization score may be determined by analyzing various types of information regarding parts or assets that make up a machine within the industrial application 24 and various types of information regarding the machine, itself. For example, the machine may refer to an industrial automation drive that converts an alternating current (AC) voltage into a direct current (DC) voltage and converts the DC voltage into a controllable AC voltage. The parts or assets of the industrial automation drive may include the HMI used to control the drive, as well as various sensors used to detect various operating conditions (e.g., voltage, current, temperature) of the drive.

Referring to FIG. 7, information, such as spare information 102, reparability information 104, technical segment information 106, and lifecycle information 108, regarding each part or asset within a particular machine may be analyzed by a part analysis component 110 being executed by the computing device 26. Using the provided information, the part analysis component 110 may generate a part score 112 for the part or asset being analyzed. The part analysis component 110 may then determine the part score 112 for each part in the particular machine being analyzed. Using the part scores 112 of the parts disposed in the particular machine, the computing device 26 may determine the prioritization score, which will be described in greater detail below.

Referring back to the inputs provided to the part analysis component 110, the spare information 102 may include data (e.g., weight or rating) described as being part of the inventory information 62 discussed above. That is, the spare information 102 may specify whether a spare part for the respective part is available on hand or at the facility in which the particular machine is operating.

The reparability information 104 may correspond to the reparability categories discussed above with regard to the equipment information 52. As such, the reparability information 104 may include data related to the reparability category that corresponds to the respective part and the corresponding weight for the respective part with respect to its reparability category.

The technical segment information 106 may correspond to the technical segment categories discussed above with regard to the equipment information 52. As such, the technical segment information 106 may indicate whether the respective part is available to be acquired via a local distributor or the like. Moreover, the technical segment category associated with the respective part may also be associated with a particular weight or rating that is provided to the part analysis component 110 along with the technical segment information 106.

The lifecycle information 108 may include data related to where the part stands with regard to the product lifecycle categorizations mentioned above with regard to the equipment information 52. As such, the lifecycle information 108 may indicate a level of support that is available for the respective part from the part's manufacturer. Depending on the lifecycle categorization of the respective part, the lifecycle information 108 may include a weight or rating for the respective part to quantify the risk associated with the corresponding lifecycle categorization of the part.

Upon receiving the spare information 102, the reparability information 104, the technical segment information 106, and the lifecycle information 108, the part analysis component 110 may use the weights provided by the information to determine a part score 112. Generally, each respective weight corresponds to a value that may quantify a relative importance of the respective part with respect to other parts in the machine and with respect to an overall effect of the respective part as it is installed within the industrial automation equipment 16. In one embodiment, the part analysis component 110 may normalize the combined weights regarding the respective part based on the quantity of parts present in the respective machine. As such, the parts analysis component 110 may determine a product of the received weights and a quantity of the respective part present within the respective machine. The parts analysis component 110 may then divide the result of that product by the quantity to determine a normalized parts score. Equation 1 below provides an expression that indicates how the part score 112 may be determined.

$$\text{Product Score} = (\text{Reparability Weight} * \text{Technical Segment Weight} * \text{Lifecycle Weight} * \text{Quantity}) / \text{Quantity} \quad (1)$$

In addition to analyzing data regarding the parts that are part of a machine, the computing device 26 may also analyze data regarding the particular machine to determine a machine score. For instance, the computing device 26 may receive expected life information 114, reliability information 116, machine priority information 118, support information 120, expected machine downtime information 122, and expected mean time to repair (MTTR) information 124 via a machine analysis component 126 to determine a machine score 130.

Generally, the expected life information 114, the reliability information 116, and the machine priority information 118 may correspond to the life expectancy information 58, the reliability information 54, and the priority information 56, discussed above, respectively. As such, the expected life information 114, the reliability information 116, and the machine priority information 118 may include respective weights or ratings that quantify a relative importance of the respective machine with respect to each factor and a user's preferences.

The support information 120 may indicate the support type categorization associated with the respective machine as described above with respect to the equipment information 52. As such, the support information 120 may also include data related to the support type weight associated with the respective machine.

In the same manner, the expected machine downtime information 122 and the expected MTTR information 124 may indicate the expected downtime categorization and the expected MTTR categorization associated with the respective machine as described above with respect to the equipment information 52. As such, the expected machine downtime information 122 and the expected MTTR information 124 may also include data related to the weights associated with the respective machine in view of the corresponding expected downtime categorization and the expected MTTR categorization associated with the respective machine.

After receiving the expected life information 114, the reliability information 116, the machine priority information 118, the support information 120, the expected machine downtime information 122, and the expected mean time to repair (MTTR) information 124, the machine analysis component 126 may determine the machine score 130 according to Equation 2 provided below.

$$\text{Machine Score} = (\text{Expected Life Weight} * \text{Reliability Weight} * \text{Priority Weight} * \text{Support Weight} * \text{Machine Downtime Weight} * \text{Expected MTTR Weight}) \quad (2)$$

It should be noted that in Equations 1 and 2, weight information that may be missing or may not be available for any of the input values used to determine the part score 112 or the machine score 130 may be assigned a 1 or unity value. As such, the missing information should have no effect on the resulting score.

After determining the machine score 130 and the part score 112 for each part in the respective machine in which information is available, the computing device 26 may use a machine and parts analysis component 132 to determine an equipment prioritization score 134. The combination of the machine score 130 and the part score 112 for each part in the respective machine may create a correlated relationship between the parts by themselves and with the ones installed across the machine, as well as a total score for the machine. In one embodiment, the equipment prioritization score 134 may be determined based on a average part score for each part of a respective machine and the machine score as indicated below in Equation 3.

$$\text{Equipment Prioritization Score} = (\text{Average Parts Score} + \text{Machine Score}) \quad (3)$$

In some embodiments, the equipment prioritization score 134 may be determined based on the machine score 130 alone. In the same manner, the equipment prioritization score 134 for a part or asset within a machine may be determined based on the part score 112 along.

By determining the equipment prioritization score 134 for each machine or part within the machine that is part of the industrial automation equipment 16 in the industrial application 24, each piece of equipment 16 may be ranked with regard to each other based on a user's custom inputs with respect to the spare information 102, the reparability information 104, the technical segment information 106, the lifecycle information 108, the expected life information 114, the reliability information 116, the machine priority information 118, the support information 120, the expected machine downtime information 122, and the expected mean time to repair (MTTR) information 124 discussed above. Moreover, the equipment prioritization score 134 may accurately reflect a relative importance of each piece of the industrial automation equipment 16 with respect to the user. As such, the user may quickly identify pieces of equipment 16 that may use service, replacement, or modifications to ensure that the industrial application 24 operates efficiently.

Figure 8:
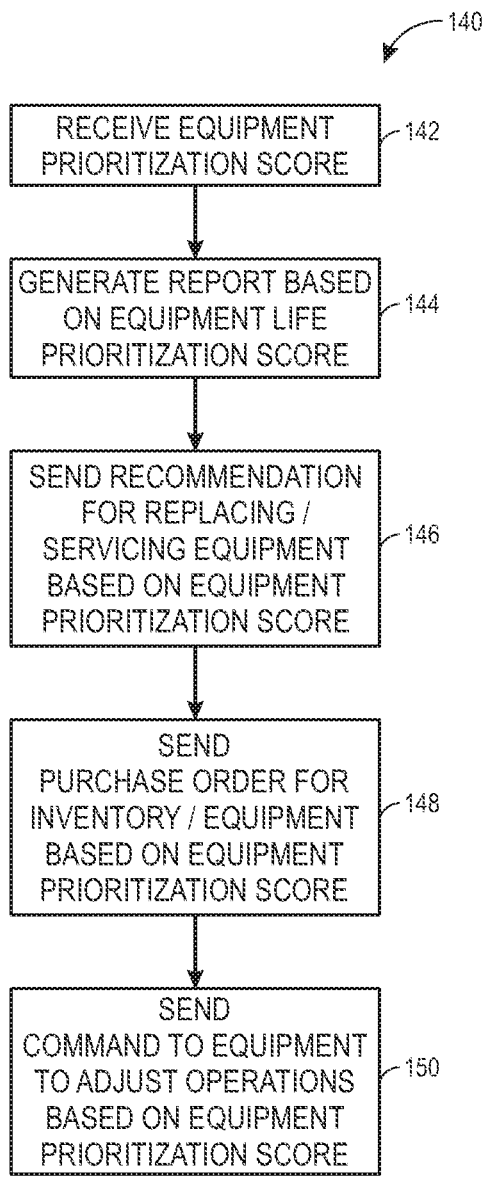
FIG. 8 is a flow chart of a method for performing certain actions based on the equipment prioritization score determined according to the flow chart of FIG. 6, in accordance with embodiments presented herein.

FIG. 8 is a flow chart of a method 140 for performing certain actions based on the equipment lifecycle prioritization score 134. Like the method 80 of FIG. 6 described above, the method 140 is described as being performed by the computing device 26, but it should be noted that any suitable computing system may perform the method 140 described herein. Also, although the method 140 is described in a particular order, it should be understood that the method 140 may be performed in any suitable order.

Referring now to FIG. 8, at block 142, the computing device 26 may receive the equipment prioritization score 134 associated with one or more pieces of the industrial automation equipment 16. At block 144, the computing device 26 may generate a report based on the equipment prioritization score 134 associated with one or more pieces of the industrial automation equipment 16. As such, the computing device 26, in one embodiment, may generate a spreadsheet that lists each piece of the industrial automation equipment 16 organized according to its respective equipment prioritization score 134.

FIG. 9 illustrates an example report generated based on the equipment prioritization score 134. As illustrated in FIG. 9, the part score 112 and the machine score 130 may be listed for each piece of equipment 16 along with the corresponding equipment prioritization score 134. As such, the user may view the generated report to identify pieces of equipment 16 that may use service, can be replaced, and the like.

Referring back to FIG. 8, at block 146, the computing device 26 may automatically send a request to a technician or a service provider to replace or service a piece of the industrial automation equipment 16 based on the respective equipment prioritization score 134. In one embodiment, if the respective equipment prioritization score 134 is greater than a threshold, the computing device 26 may adjust a schedule of a technician to indicate that the respective piece of equipment 16 is to be replaced, send a request to the cloud-based computing system 28 to receive virtual assistance to formulate a plan to minimize risk of the respective piece of equipment 16 from decreasing efficiency of the industrial application 24, and the like.

At block 148, the computing device 26 may create and send a purchase order to purchase additional spare pieces of equipment 16 or to restock inventory levels at the respective facility. In embodiment, the computing device 26 may send the purchase order when the respective equipment prioritization score 134 is above a threshold.

At block 150, the computing device 26 may send one or more commands to the industrial automation equipment 16 to adjust the operations of certain pieces of equipment 16 based on the respective equipment prioritization scores 134. For instance, the computing device 26 may send the commands to adjust the operations when the equipment prioritization scores are above a threshold. In one embodiment, the commands may cause the pieces of equipment 16 to reduce its speed or throughput to minimize wear on the respective piece of equipment 16 and to prolong the expected life of the respective piece of equipment 16.

Technical effects of the embodiments described herein include efficiently managing the maintenance of industrial automation equipment within a facility. By efficiently sharing data between a computing device, an automation controller, and a cloud-based computing system, maintenance of the equipment within the industrial application 24 may be performed more efficiently. Moreover, by providing various mechanisms and reports to organize large amounts of data acquired via various network connects, the technical effects of the embodiments described herein provide users with the ability to interpret information regarding the equipment being managed based on the acquired data.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method for controlling one or more operations of a plurality of industrial automation devices in an industrial system, comprising:
    receiving, via a processor, a first set of identification information regarding the plurality of industrial automation devices from a computing device;
    receiving, from one or more databases via the processor, a first set of information associated with the plurality of industrial automation devices based on the first set of identification information, wherein the first set of information comprises:
        reliability information regarding each industrial automation device of the plurality of industrial automation devices, wherein the reliability information comprises historical maintenance data associated with a respective industrial automation device;
        life expectancy information regarding each industrial automation device of the plurality of industrial automation devices, wherein the life expectancy information comprises an estimated remaining service life of the respective industrial automation device; and
        a second set of identification information regarding each part of a set of parts of the plurality of industrial automation devices;
    receiving, from the one or more databases via the processor, a second set of information associated with each part of the set of parts of the plurality of industrial automation devices based on the second set of identification information, wherein the second set of information comprises:
inventory information regarding each part of the set of parts, wherein the inventory information comprises an availability of a replacement part for the part in an inventory associated with the industrial system; and
lifecycle information regarding each part of the set of parts, wherein the lifecycle information corresponds to a degree of manufacturer support available for a respective part;
determining, via the processor, a maintenance order of each part of the set of parts of the plurality of industrial automation devices based on the reliability information, the life expectancy information, the inventory information, and the lifecycle information, wherein the maintenance order comprises a listing of each part of the set of parts of the plurality of industrial automation devices according to a maintenance priority of each part of the set of parts; and
transmitting, to the computing device, an indication of one or more service recommendations based on the maintenance order.

2. The method of claim 1, wherein the first set of information comprises:
priority information regarding each industrial automation device of the plurality of industrial automation devices;
support information regarding each industrial automation device of the plurality of industrial automation devices;
expected down time information regarding each industrial automation device of the plurality of industrial automation devices;
expected mean time to repair information regarding each industrial automation device of the plurality of industrial automation devices;
process line information regarding each industrial automation device of the plurality of industrial automation devices; or
a combination thereof.

3. The method of claim 1, wherein the second set of information comprises reparability information regarding each part of the set of parts, technical segment information regarding each part of the set of parts, or both.

4. The method of claim 1, wherein the reliability information regarding each industrial automation device comprises a degree of reliability for the industrial automation device based on empirical data regarding a similar industrial automation device in a different industrial system and a maintenance record associated with the industrial automation device, downtime of the industrial automation device over a period of time; a review of the industrial automation device, or empirical data regarding the industrial automation device, or a combination thereof.

5. The method of claim 1, wherein the estimated remaining service life of the industrial automation device comprises a total amount of service time associated with the industrial automation device, an expected amount of service time before maintenance is performed on the industrial automation device, or both.

6. The method of claim 1, comprising:
sending, via the processor, a command to one or more industrial automation devices of the plurality of industrial automation devices to adjust a speed or a throughput of the one or more operations to minimize wear on the one or more industrial automation devices based on the maintenance order of each part of the set of parts.

7. The method of claim 1, comprising:
generating, via the processor, a report including a listing of each industrial automation device of the plurality of industrial automation devices based on the maintenance priority of each part of the set of parts, and the listing of each part of the set of parts of the plurality of industrial automation devices in accordance with the maintenance priority of each part of the set of parts; and
transmitting, via the processor, the report to the computing device for display.

8. The method of claim 1, wherein determining the maintenance order of each part of the set of parts comprises determining a relative maintenance importance of each part of the set of parts with respect to each other part of the set of parts based on respective weights attributed to the reliability information, the life expectancy information, the inventory information, and the lifecycle information.

9. The method of claim 1, wherein the one or more service recommendations comprise a first recommendation to service one or more parts of the set of parts at a particular time and a second recommendation to service the one or more parts of the set of parts at one or more alternative times.

10. The method of claim 1, wherein the one or more service recommendations comprises a first recommendation to maintain a number of replacement parts for a first part of the set of parts in an inventory associated with the industrial system, a second recommendation to relocate a second part of the set of parts to another location associated with the industrial system, or both.

11. A non-transitory computer-readable medium comprising computer-executable instructions for controlling one or more operations of one or more industrial automation devices in an industrial system, wherein the computer-executable instructions are configured to cause a processor to:
receive a first set of identification information regarding a plurality of industrial automation devices from a computing device;
receive, from one or more databases, a first set of information associated with the plurality of industrial automation devices based on the first set of identification information, wherein the first set of information comprises:
reliability information regarding each industrial automation device of the plurality of industrial automation devices, wherein the reliability information comprises historical maintenance data associated with a respective industrial automation device;
life expectancy information regarding each industrial automation device of the plurality of industrial automation devices, wherein the life expectancy information comprises an estimated remaining service life of the industrial automation device; and
a second set of identification information regarding each part of a set of parts of the plurality of industrial automation devices;
receive, from the one or more databases, a second set of information associated with each part of the set of parts of the plurality of industrial automation devices based on the second set of identification information, wherein the second set of information comprises:
inventory information regarding each part of the set of parts, wherein the inventory information comprises an availability of a replacement part for the part in an inventory associated with the industrial system; and lifecycle information regarding each part of the set of parts, wherein the lifecycle information comprises a degree of manufacturer support available for a respective part;

determine a maintenance order of each part of the set of parts of the plurality of industrial automation devices based on the reliability information, the life expectancy information, the inventory information, and the lifecycle information, wherein the maintenance order comprises a listing of each part of the set of parts of the plurality of industrial automation devices according to a maintenance priority of each part of the set of parts; and generate and transmit a report to the computing device for display, wherein the report comprises a listing of each industrial automation device of the plurality of industrial automation devices based on the maintenance priority of each part of the set of parts, and the listing of each part of the set of parts of the plurality of industrial automation devices in accordance with the maintenance priority of each part of the set of parts.

12. The non-transitory computer-readable medium of claim 11, wherein the first set of information comprises:
priority information regarding each industrial automation device of the plurality of industrial automation devices;
support information regarding each industrial automation device of the plurality of industrial automation devices;
expected down time information regarding each industrial automation device of the plurality of industrial automation devices;
expected mean time to repair information regarding each industrial automation device of the plurality of industrial automation devices;
process line information regarding each industrial automation device of the plurality of industrial automation devices; or
a combination thereof.

13. The non-transitory computer-readable medium of claim 11, wherein the second set of information comprises reparability information regarding each part of the set of parts, technical segment information regarding each part of the set of parts, or both.

14. The non-transitory computer-readable medium of claim 11, wherein the reliability information regarding each industrial automation device comprises a degree of reliability for the industrial automation device based on a maintenance record associated with the industrial automation device, downtime of the industrial automation device over a period of time; a review of the industrial automation device, empirical data regarding the industrial automation device, or empirical data regarding a similar industrial automation device in a different industrial system, or a combination thereof.

15. The non-transitory computer-readable medium of claim 11, wherein the estimated remaining service life of the industrial automation device comprises a total amount of service time associated with the industrial automation device, an expected amount of service time before maintenance is performed on the industrial automation device, or both.

16. The non-transitory computer-readable medium of claim 11, wherein the computer-executable instructions are configured to cause a processor to:
receive a user input from the computing device to adjust a speed or throughput of one or more operations to minimize wear on one or more industrial automation devices of the plurality of industrial automation devices; and
send a command to the one or more industrial automation devices to adjust the speed or the throughput of the one or more operations in response to receiving the user input.

17. A system, comprising:
a plurality of industrial automation devices; and
a computing device configured to:
receive one or more user inputs indicative of a first set of identification information regarding the plurality of industrial automation devices from a user device;
receive, from one or more databases, a first set of information associated with the plurality of industrial automation devices based on the first set of identification information, wherein the first set of information comprises:
reliability information regarding each industrial automation device of the plurality of industrial automation devices, wherein the reliability information comprises historical maintenance data associated with a respective industrial automation device;
life expectancy information regarding each industrial automation device of the plurality of industrial automation devices, wherein the life expectancy information comprises an estimated remaining service life of the respective industrial automation device; and
a second set of identification information regarding each part of a set of parts of the plurality of industrial automation devices;
receive, from the one or more databases, a second set of information associated with each part of the set of parts of the plurality of industrial automation devices based on the second set of identification information, wherein the second set of information comprises:
inventory information regarding each part of the set of parts; and lifecycle information regarding each part of the set of parts, wherein the inventory information comprises an availability of a replacement part for the part in an inventory associated with an industrial system; and
lifecycle information regarding each part of the set of parts, wherein the lifecycle information corresponds to a degree of manufacturer support available for a respective part;
determine a maintenance order of each part of the set of parts of the plurality of industrial automation devices based on the reliability information, the life expectancy information, the inventory information, and the lifecycle information, wherein the maintenance order comprises a listing of each part of the set of parts of the plurality of industrial automation devices according to a maintenance priority of each part of the set of parts; and
transmit, to the user device, an indication of one or more service recommendations based on the maintenance order.

18. The system of claim 17, wherein the first set of information comprises:
priority information regarding each industrial automation device of the plurality of industrial automation devices;
support information regarding each industrial automation device of the plurality of industrial automation devices;

expected down time information regarding each industrial automation device of the plurality of industrial automation devices;

expected mean time to repair information regarding each industrial automation device of the plurality of industrial automation devices;

process line information regarding each industrial automation device of the plurality of industrial automation devices; or a combination thereof.

19. The system of claim 17, wherein the second set of information comprises reparability information regarding each part of the set of parts, technical segment information regarding each part of the set of parts, or both.

20. The system of claim 17, wherein the computing device is configured to send a command to one or more industrial automation devices of the plurality of industrial automation devices to adjust a speed or a throughput of one or more operations to minimize wear on one or more industrial automation devices based on the maintenance order of each part of the set of parts.

* * * * *